(12) United States Patent
Yamada et al.

(10) Patent No.: US 6,628,360 B2
(45) Date of Patent: Sep. 30, 2003

(54) LIQUID CRYSTAL DISPLAY DEVICE INCLUDING LIQUID CRYSTAL LAYER HAVING LIQUID CRYSTAL MOLECULES HOMOGENEOUSLY ALIGNED

(75) Inventors: Hiroko Yamada, Sagamihara (JP); Seiichi Kizaki, Tsuru (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 09/817,105

(22) Filed: Mar. 26, 2001

(65) Prior Publication Data

US 2001/0028428 A1 Oct. 11, 2001

(30) Foreign Application Priority Data

Mar. 27, 2000 (JP) ........................................ 2000-087245
Mar. 27, 2000 (JP) ........................................ 2000-087248

(51) Int. Cl.[7] ................................................ G02F 1/13
(52) U.S. Cl. ........................................................ 349/132
(58) Field of Search ................................ 349/132, 141, 349/99, 100

(56) References Cited

U.S. PATENT DOCUMENTS 5,465,168 A * 11/1995 Koden et al. .................. 349/33
5,760,857 A * 6/1998 Yanagawa et al. ............. 349/43
5,978,059 A * 11/1999 Ohta et al. ................... 349/141
6,356,329 B1 * 3/2002 Tamatani et al. ........... 349/141

* cited by examiner

Primary Examiner—Kenneth Parker
(74) Attorney, Agent, or Firm—Frishauf, Holtz, Goodman & Chick, P.C.

(57) ABSTRACT

A liquid crystal display device includes a first substrate having at least one first electrode formed thereon, and a second substrate having a plurality of second electrodes formed thereon and opposed to the first electrode, a matrix display section being formed which has a plurality of pixel electrodes constituted of the first and second electrodes and arranged in a matrix of rows and columns. The second substrate is opposed to the first substrate with a predetermined gap therebetween. First and second alignment films respectively are formed on the opposed inner surfaces of the first and second substrates. A liquid crystal is sealed between the first and second substrates. An aligning treatment is executed on the first alignment film in a first direction that intersects, at an angle of 5° to 10°, one of a row direction and a column direction of the matrix display section.

14 Claims, 5 Drawing Sheets

LIQUID CRYSTAL DISPLAY DEVICE INCLUDING LIQUID CRYSTAL LAYER HAVING LIQUID CRYSTAL MOLECULES HOMOGENEOUSLY ALIGNED

CROSS-REFERENCE TO RELATED APPLICATIONS

This application is based upon and claims the benefit of priority from the prior Japanese Patent Applications No. 2000-087245, filed Mar. 27, 2000; and No. 2000-087248, filed Mar. 27, 2000, the entire contents of both of which are incorporated herein by reference.

BACKGROUND OF THE INVENTION

The present invention relates to a liquid crystal display device including a liquid crystal layer having liquid crystal molecules homogeneously aligned between opposed substrates.

A TN (Twisted Nematic) type liquid crystal display device, in which a liquid crystal layer having its molecule alignment twisted at a predetermined angle is sealed between a pair of substrates, and a pair of polarizing plates are arranged on the substrates interposed therebetween, is widely applicable as various types of display elements, because of a high contrast and excellent electro-optic properties.

The TN type liquid crystal display device has a high contrast at front view. It unpreferably shows great changes in contrast when observed in a direction inclined from its normal line, and therefore has a narrow viewing angle. To widen the viewing angle, an optical compensation element, such as a retardation plate, is used.

Since, however, the liquid crystal layer of the TN type liquid crystal display device has a twisted molecule alignment, it is difficult to perform a sufficient optical compensation.

In the case of a liquid crystal device of a homogeneous-alignment type, in which liquid crystal molecules sealed between a pair of substrates are aligned in one direction in their initial state, i.e. the molecule alignment is not twisted, it is easier to compensate for its optical properties and to widen its viewing angle than in the TN type liquid crystal display device.

The homogeneous-alignment type liquid crystal display device comprises a liquid crystal element, in which nematic liquid crystal molecules having a positive dielectric anisotropy and a homogeneous alignment are sealed as a liquid crystal layer between a pair of transparent substrates having transparent electrodes mounted on their opposed inner surfaces and alignment films mounted on the electrodes. The device further includes a pair of polarizing plates provided with the liquid crystal element interposed therebetween.

In a conventional homogeneous-alignment type liquid crystal display device, the stability of the homogenous molecule alignment of the liquid crystal layer depends upon the anchoring of the alignment film and the natural cohesive power of the nematic liquid crystal (the intermolecular force of liquid crystal molecules, which urges the molecules to be arranged in one direction). This means that the liquid crystal molecules may be irregularly aligned.

In other words, in the initial state of alignment, an irregular alignment may easily occur, in which the major axes of liquid crystal molecules are not uniformly aligned in one direction.

Further, in the homogenous-alignment type liquid crystal display device, the axes of molecules will be changed to accord with a direction perpendicular to the surface of the substrate in accordance with an electric field applied between the electrodes on the substrates. If the electric field is turned off after the molecules thus move to a large extent, the molecules do not return to the original state of homogeneous alignment in which the directors of the molecules are arranged in one direction, thereby raising an irregular alignment.

Moreover, in such a type liquid crystal display device, disclination may be created by an irregular alignment around each pixel electrode formed on the inner surface of one of the substrates. This irregular alignment occurs due to the influence of, for example, the height difference between the pixel electrodes and their peripheral wiring, and an electric field that occurs between each pixel electrode and the wiring.

In addition, if the substrate of the liquid crystal element is deformed by an external force and the alignment state of liquid crystal molecules at and around the deformed portion is greatly changed, the molecules do not return, even after the deformed substrate is restored, to the original state of homogeneous alignment in which the directors of the molecules are arranged in one direction, thereby raising an irregular alignment.

As described above, the conventional homogenous-alignment type liquid crystal display device is disadvantageous in that the homogenous alignment state of liquid crystal molecules will easily become irregular, thereby raising a defective state, i.e. a degraded contrast in the irregularly aligned region of the display.

BRIEF SUMMARY OF THE INVENTION

It is an object of the invention to provide a liquid crystal display device having a liquid crystal layer in which molecules are uniformly aligned in a less defective state, thereby maintaining a high quality display.

It is another object of the invention to provide a homogenous-alignment type liquid crystal display device, in which the occurrence of disclination around each pixel electrode is suppressed, and hence which can display high quality images.

To attain the objects, the invention provides a liquid crystal display device comprising: a first substrate having at least one first electrode formed thereon; a second substrate having a plurality of second electrodes formed thereon and opposed to the first electrode, the second substrate being opposed to the first substrate with a predetermined gap therebetween, the second electrodes being arranged to form a matrix display section having a plurality of pixels arranged in a matrix of rows and columns, each of the pixels being defined by an area in which the first electrode is opposed to each of the second electrodes; a first alignment film formed on the second substrate with the second electrodes, an aligning treatment being executed on the first alignment film in a first direction that intersects, at an angle of 5° to 10°, one of a row direction and a column direction of the matrix display section; a second alignment film formed on the first substrate having the first electrode formed thereon, an aligning treatment being executed on the second alignment film in a second direction substantially parallel to the first direction of the first alignment film; and a liquid crystal sealed between the first and second substrates and constituting a liquid crystal layer that ranges from liquid crystal molecules adjacent to the first alignment film to liquid crystal molecules adjacent to the second alignment film, all liquid crystal molecules in the liquid crystal layer being arranged in one direction.

Since, in this liquid crystal display device, the alignment directions of the inner surfaces of a pair of substrates obliquely intersect, at an angle of 5° to 10°, one of a row direction and a column direction of the matrix in one direction, the occurrence of disclination is suppressed, which is due to a lateral electric field created between each pixel electrode and a line adjacent thereto, and/or due to the influence of a height difference between each pixel and a line adjacent thereto, or due to the influence of the aligning treatment. As a result, a high-quality image can be displayed.

In the above structure, it is preferable that the first direction, in which the aligning treatment is executed on the first alignment film, intersects, at an angle of 7° to 8°, one of the row direction and the column direction of the matrix display section. Most preferably, the angle is 7.5°.

Preferably, the liquid crystal display device further comprises a pair of polarizing plates each provided at an outer side of a corresponding one of the first and second substrates, the polarizing plates having their respective optical axes arranged perpendicular to each other. More preferably, the optical axis of one of the polarizing plates intersects, substantially at an angle of 45°, the second and first directions of the respective second and first alignment films respectively provided on the first and second substrates.

Further preferably, the liquid crystal display device further comprises a pair of polarizing plates each provided at an outer side of a corresponding one of the first and second substrates, and a retardation plate provided between the first substrate and a corresponding one of the polarizing plates for correcting retardation of the liquid crystal layer. It is desirable that the retardation plate should have its optical axis arranged to intersect, substantially at an angle of 90°, the second and first directions of the respective second and first alignment films respectively provided on the first and second substrates.

More preferably, the liquid crystal is a liquid crystal mixed with a chiral substance that imparts, to the liquid crystal molecules, a power for twisting the liquid crystal molecules, and the liquid crystal layer is homogeneously aligned, without being twisted, between the first and second alignment films by alignment forces of the first and second alignment films.

Since, thus, the liquid crystal layer of the liquid crystal cell is made of a nematic liquid crystal mixed with a chiral agent so that the liquid crystal molecules in it are homogeneously aligned without being twisted, an intermolecular force is exerted on the liquid crystal molecules by the chiral agent added to the liquid crystal, as well as by the anchoring of the alignment films 7 and 8 and the natural cohesive force of the nematic liquid crystal molecules themselves. As a result, the stability of the alignment of the liquid crystal molecules is enhanced, and hence a very stable homogeneous alignment of the molecules, in which the directors of the molecules are arranged in one direction, is realized.

It is preferable that the liquid crystal is a nematic liquid crystal mixed with a chiral agent, and the amount of the chiral agent is determined so that the ratio d/p of the thickness d ($\mu$m) of the liquid crystal layer to the natural pitch p ($\mu$m) of the nematic liquid crystal mixed with the chiral agent is less than 0.09. It is more preferable that the amount of the chiral agent is determined so that the ratio d/p of the thickness d ($\mu$m) of the liquid crystal layer to the natural pitch p ($\mu$m) of the nematic liquid crystal mixed with the chiral agent is not more than 0.075.

The liquid crystal display device of the invention further comprises a plurality of active elements arranged on the second substrate and connected to the respective second electrodes on the second substrate, and a plurality of lines arranged along respective rows or columns of second electrodes in a matrix for supplying a voltage to the active elements, an aligning treatment being executed on the first alignment film so that a direction of alignment intersects the plurality of lines at an angle of 5° to 10°.

It is desirable that a plurality of thin-film transistors arranged on the second substrate and connected to the respective second electrodes on the second substrate should be used as the active elements. In this case, a plurality of control lines are arranged along respective rows or columns of second electrodes in a matrix for supplying a control signal to the thin-film transistors, and a plurality of data lines are arranged along respective columns or rows of second electrodes for supplying a signal corresponding to display data to the second electrodes via the thin-film transistors. An aligning treatment is executed on the first alignment film so that a direction of alignment intersects the control lines or the data lines, preferably, the data lines, at an angle of 5° to 10°.

The above structure of the liquid crystal display device, using the active elements, enables the alignment force of the alignment film on the inner surface of the rear substrate to balance with the force of the lateral electric field in the liquid crystal molecules in an unstable alignment state due to the unevenness of portions of the alignment films adjacent to the gate lines and data lines, thereby suppressing an irregular alignment of the liquid crystal molecules, and hence making disclination indistinctive, which occurs between each pixel electrode and one or both of a corresponding gate line and a corresponding data line.

Also in an active matrix type liquid crystal display device using thin-film transistors, it is preferable that a liquid crystal mixed with a chiral substance which imparts, to the liquid crystal molecules, a power for twisting the liquid crystal molecules is used as the liquid crystal, and the liquid crystal layer is homogeneously aligned, without being twisted, between the first and second alignment films by alignment forces of the first and second alignment films. In this case, it is desirable that the amount of the chiral agent should be determined so that the ratio d/p of a thickness d ($\mu$m) of the liquid crystal layer to the natural pitch p ($\mu$m) of the nematic liquid crystal mixed with the chiral agent is less than 0.09.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Liquid crystal display devices will be described as embodiments of the present invention with reference to the accompanying drawings.

[First Embodiment]

Figure 1:
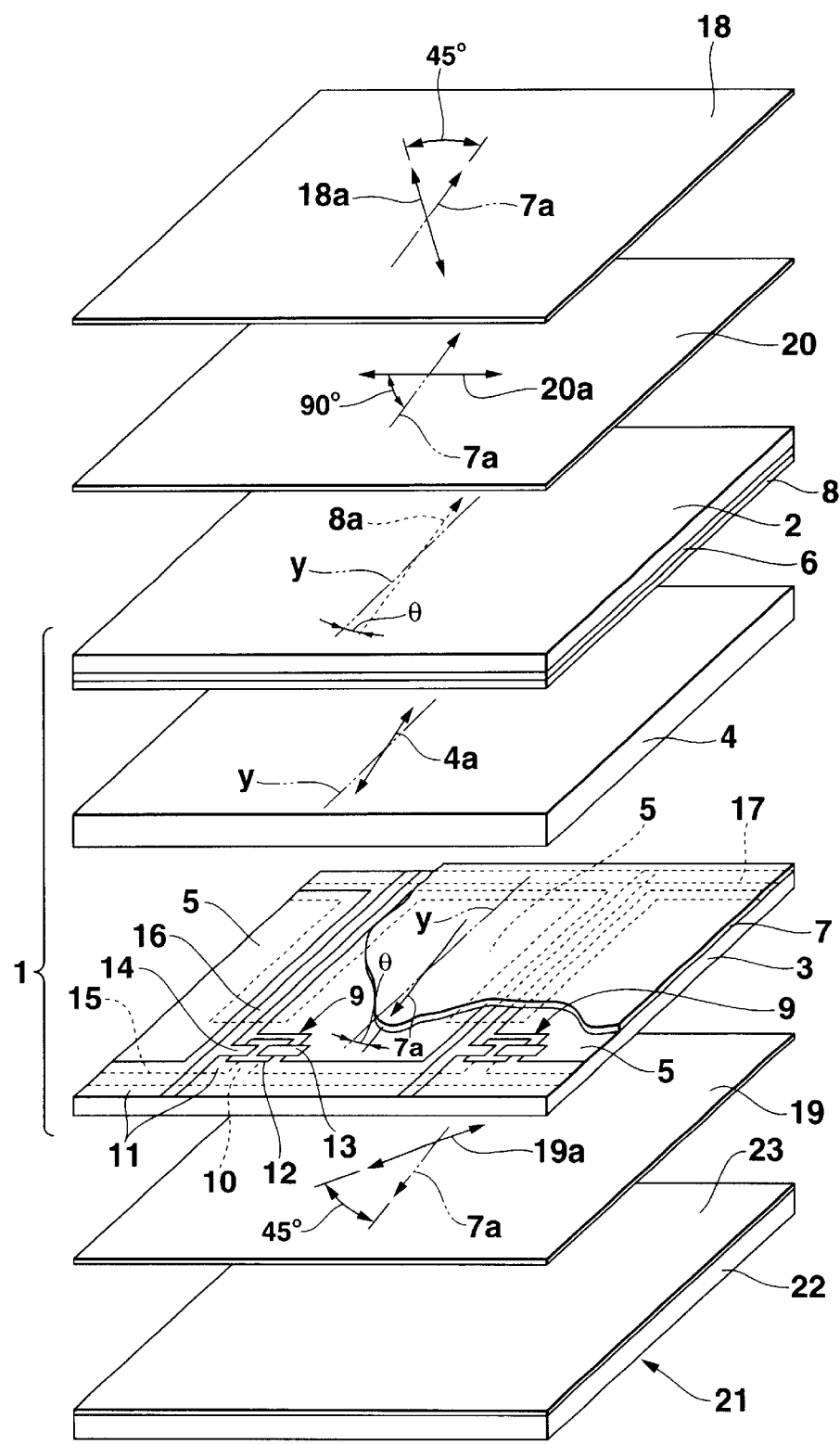
FIG. 1 is an exploded perspective view illustrating a liquid crystal display device according to a first embodiment of the invention.

FIG. 1 shows a first embodiment of the invention. A liquid crystal display device employed in a liquid crystal display device according to the first embodiment is designed to execute both a display using the reflection of outside light, and a display using the transmission of light illuminated from the back of the element. In other words, this device is of a reflection/transmission type. The device comprises a liquid crystal cell 1, a pair of polarizing plates 18 and 19 respectively arranged on the outer surface of a front substrate 2 and the outer surface of a rear substrate 3, with the liquid crystal cell 1 interposed therebetween, a retardation plate 20 arranged between the liquid crystal cell 1 and the front-side polarizing plate 18 provided on the front surface of the cell 1, and reflection/illumination means or unit 21 arranged on the rear surface of the rear-side polarizing plate 19 that is provided on the rear surface of the liquid crystal cell 1.

The liquid crystal cell 1 is an active matrix liquid crystal display device that uses a TFT as an active element. The cell 1 includes: a plurality of transparent pixel electrodes 5 arranged in rows and columns on the inner surface of one (for example, the rear substrate 3 situated remote from the viewing side) of the pair of front and rear transparent substrates 2 and 3 opposed to each other with a liquid crystal layer 4 interposed therebetween; a plurality of TFTs 9 connected to the pixel electrodes 5; a plurality of gate lines 15 for supplying a gate signal to the TFTs arranged in rows; a plurality of data lines 16 for supplying a data signal to the TFTs arranged in columns; and a plurality of compensation capacitance electrodes 17 that form compensation capacitances between themselves and the pixel electrodes 5.

Each TFT 9 comprises a gate electrode 10 formed on the inner surface of the rear substrate 3, a gate insulating film 11 provided on the gate electrode 10, an i-type semiconductor film 12 provided on the gate insulating film 11 and opposed to the gate electrode 10, and a source electrode 13 and a drain electrode 14 provided on respective opposite side portions of the i-type semiconductor film 12 with an n-type semiconductor film (not shown) interposed therebetween.

Each gate line 15 is provided on the inner surface of the rear substrate 3 along a corresponding row of pixel electrodes, and integrated with the electrodes 10 of the TFTs 9 of a corresponding row.

The gate insulating film (transparent film) 11 of the TFTS 9 covers substantially the entire surface of the rear substrate 3, and covers the gate lines 15 except for their terminal sections.

Each data line 16 is provided on the gate insulating film 11 along a corresponding column of pixel electrodes, and integrated with the drain electrodes 14 of the TFTs 9 of a corresponding column.

Although, in this embodiment, the data lines 16 are provided on the gate insulating film 11, and the drain electrodes 14 of the TFTS 9 of each column are integrated with the data lines 16 of a corresponding column, the data lines 16 may be provided on an interlayer insulating film formed on the TFTS, and connected to the drain electrodes 14 of the TFTS 9 in contact holes formed in the interlayer insulating film.

The pixel electrodes 5 are provided on the gate insulating film 11, and have their one-side edges connected to the source electrodes 13 of the respective TFTs 9.

Each compensation capacitance electrode 17 is provided on the inner surface of the rear substrate 3, corresponding to a corresponding row of pixel electrodes. Each compensation capacitance electrode 17, the end sections of corresponding pixel electrodes and the gate insulating film 11 therebetween constitute a compensation capacitance for compensating fluctuations in the potential of the corresponding pixel electrodes 5 when the corresponding electrodes 5 are not selected.

The compensation capacitance electrode 17 includes a line section opposed to one-end edges of corresponding pixel electrodes 5, and an extended section extending from the line section to an area defined between each pair of adjacent pixel electrodes 5 in the row direction, with a corresponding data line 16 interposed therebetween. Thus, the extension of each electrode 17 has its opposite side edges opposed to the side edges of the adjacent pixel electrodes 5, and each pixel electrode 5 has compensation capacitances formed at three edges thereof, i.e. its one-end edge and opposite side edges.

On the inner surface of the other substrate, i.e. the front substrate 2 as the observation side, a plurality of color filters (not shown) each having, for example, red, green and blue colors are provided such that they are opposed to the respective pixel electrodes 5. An electrode 6 in the form of a transparent film opposed to the pixel electrodes 5 is formed on the filter layer.

Further, homogeneous alignment films 7 and 8 made of, for example, polyimide are provided on the innermost surfaces of the substrates 2 and 3, respectively. The alignment films 7 and 8 are processed by rubbing their surfaces so that their alignments are substantially parallel to each other but opposite to each other.

More specifically, in FIG. 1, arrow 7a indicates the direction in which the molecules of the alignment film 7 on the inner surface of the rear substrate 3 are aligned, while arrow 8a indicates the direction in which the molecules of the alignment film 8 on the inner surface of the front substrate 2 are aligned. The alignment direction 7a of the alignment film 7 and the alignment direction 8a of the alignment film 8 are opposite to each other, and obliquely intersect a line "y" parallel to the data lines 16 at a rubbing angle θ of 5° to 10° in one direction, e.g. counterclockwise when viewed from the front side of the liquid crystal cell 1. The rubbing angle θ is preferably, 7° to 8° and most preferably, 7.5°.

Both substrates 2 and 3 are jointed to each other at their peripheries by means of a frame-shaped sealing member (not shown). A liquid crystal layer 4, in which the product Δnd of its thickness d and its refraction anisotropy Δn is 320 nm, is provided between the substrates 2 and 3 within the area sealed by the sealing member.

Thus, a plurality of pixels defined by areas, in which the opposed electrode 6 of the front substrate 2 is opposed to the pixel electrodes 5 of the rear substrate 3, are arranged in a matrix, i.e. in rows and columns, thereby constituting a matrix display section. The alignment direction 8a of the alignment film 8 on the inner surface of the front substrate 2 corresponds to a direction in which rows or columns of pixels of the matrix display section are arranged. Further, as aforementioned, the alignment direction 8a is set such that it obliquely intersects the line "y" parallel to the data lines 16 at the rubbing angle θ of 5° to 10°.

The liquid crystal layer 4 is formed of a nematic liquid crystal having a positive dielectric anisotropy. The molecules of the liquid crystal are slightly pre-tilted with respect to the inner surfaces (alignment films) of the substrates 2 and 3, and homogeneously aligned, without being twisted, in the alignment directions 7a and 8a of the alignment films 7 and 8 on the inner surfaces of the substrates 2 and 3.

The pair of polarizing plates 18 and 19 arranged with the liquid crystal cell 1 interposed therebetween have their respective optical axes (transmission axes or interruption axes) set in respective predetermined directions.

In FIG. 1, arrow 18a indicates the transmission axis of the front-side polarizing plate 18 provided on the outer surface of the front substrate 2 of the liquid crystal cell 1, while arrow 19a indicates the transmission axis of the rear-side polarizing plate 19 provided on the outer surface of the rear substrate 3 of the liquid crystal cell 1. In the first embodiment, the transmission axis 18a of the front-side polarizing plate 18 is set such that it obliquely intersects the alignment directions 7a and 8a at substantially 45° in one direction (in FIG. 1, counterclockwise when viewed from the front side of the liquid crystal cell 1). On the other hand, the transmission axis 19a of the rear-side polarizing plate 19 is set such that it obliquely intersects the alignment directions 7a and 8a at substantially 45° in the other direction (in FIG. 1, clockwise when viewed from the front side of the liquid crystal cell 1). In other words, the transmission axis 19a is substantially perpendicular to the transmission axis 18a.

The retardation plate 20 provided between the liquid crystal cell 1 and the front-side polarizing plate 18 has a retardation value of 50 nm, and is used to enhance the display contrast of the liquid display element and increase the viewing angle. The phase-difference plate 20 has a phase delay axis 20a, indicated by an arrow in FIG. 1, which intersects the alignment directions 7a and 8a of the alignment films 7 and 8 at substantially 90°.

The reflection/illumination means 21, located behind the rear-side polarizing plate 19 that is provided on the rear surface of the liquid crystal cell 1, has both a light reflecting function and a light emitting function. The reflection/illumination unit 21 employed in the first embodiment includes a surface light source 22 for emitting illumination light from its entire front surface, and a semi-transmission/reflection plate 23 provided on the front surface of the surface light source 22.

The surface light source 22 is constituted of, for example, a transparent light guide plate for emitting light, guided from its end face, through the entire front surface, and a tubular phosphor lamp or a plurality of light-emitting diodes opposed to the end face of the light guide plate.

In a bright place, the liquid crystal display device executes a reflection display using the reflection of outside light. In the case of the reflection display, light entering the liquid crystal display device through its front surface, and passing through the front-side polarizing plate 18, the phase-difference plate 20, the liquid crystal cell 1 and the rear-side polarizing 19 is reflected by the semi-transmission/reflection plate 23 of the reflection/illumination unit 21. The reflected light is guided to the front surface of the display device through the rear-side polarizing plate 19, the liquid crystal cell 1, the phase-difference plate 20 and the front-side polarizing plate 18.

On the other hand, in a place where a sufficient amount of outside light cannot be obtained, the liquid crystal display device executes a transmission display using illumination light emitted from the surface light source 22 of the reflection/illumination unit 21. In the case of the transmission display, the illumination light emitted from the surface light source 22 is guided to the front surface of the display device through the semi-transmission/reflection plate 23, the rear-side polarizing plate 19, the liquid crystal cell 1, the phase-difference plate 20 and the front-side polarizing plate 18.

When executing the reflection display or the transmission display, liquid crystal molecules in a plurality of pixel areas, in which the pixel electrodes 5 and the opposed electrode 6 of the liquid crystal cell 1 are provided, polarize in a direction substantially perpendicular to the substrates 2 and 3 from their initial homogenously-aligned state in accordance with a voltage applied between the pixel electrodes 5 and the opposed electrode 6. This results in a change in the double reflection of the liquid crystal layer, whereby the light transmittance is controlled by the changed double reflection of the liquid crystal layer and the polarizing function of the polarizing plates 18 and 19. As a result, the brightness of a display in each pixel area is changed to thereby display an image.

As described above, in the first embodiment, the transmission axes 18a and 19a of the front-side and rear-side polarizing plates 18 and 19 are set such that they obliquely intersect, at substantially 45°, the alignment directions 7a and 8a of the alignment films 7 and 8 formed on the inner surfaces of the substrate 2 and 3 of the liquid crystal cell 1. Further, the transmission axes 18a and 19a of the polarizing plates 18 and 19 are substantially perpendicular to each other. Therefore, a display is brightest when the liquid crystal molecules are homogenously aligned in their initial state, and becomes darker when the molecules tilt away from a plane that is parallel to the substrates 2 and 3.

Accordingly, in the liquid crystal display device, it is sufficient if the voltage applied between the pixel electrodes 5 and the opposed electrode 6 of the cell 1, i.e. the voltage of a data signal supplied to each pixel electrode 5 from a corresponding data line 16 via a corresponding TFT 9, is controlled between a voltage at which the liquid crystal molecules are homogenously aligned in their initial state, and a voltage at which they assume their polarization state that provides a darkest display.

In this liquid crystal element, the initial alignment state of the liquid crystal layer of the cell 1 is a homogeneous one that is not twisted. Therefore, a phase difference in light transmitting the liquid crystal layer due to the difference of the viewing angle alignment state of the liquid crystal molecules can be easily compensated by a phase-difference plate made of a single-axis aligned film, or made of a film in which the major axes of macro molecules are aligned in a thickness direction of the film. As a result, a non-colored display having sufficiently compensated optical properties and hence a wide viewing angle can be obtained.

Moreover, in the above liquid crystal display device, the alignment directions 7a and 8a of the alignment films 7 and 8 provided on the substrates 2 and 3 of the liquid crystal cell 1 obliquely intersect the data lines 16 at a rubbing angle θ of 5° to 10° in one direction. Accordingly, the occurrence of disclination can be suppressed, which is due to the influence of a lateral electric field that occurs between one or both of each gate line 15 and each data line 16 and corresponding pixel electrodes 5, due to the influence of a structure such as a height difference between the gate lines 15 and the data lines 16, or due to the influence of an aligning treatment. As a result, the liquid crystal display device can display a high-quality image.

Specifically, in the above-described active matrix type liquid crystal display device, a plurality of gate lines 15 are provided on the inner surface of the rear substrate 3 along one side of respective rows of pixel electrodes, and a plurality of data lines 16 are provided on the inner surface of the rear substrate 3 along one sides of respective columns of pixel electrodes. In this structure, a lateral electric field can occur along the inner surface of the substrate 3 between each gate line 15 and the edges of pixel electrodes 5 adjacent to each gate line 15, and between each data line 16 and the edges of pixel electrodes 5 adjacent to each data line 16.

In addition, the surface of the alignment film 7a formed on the inner surface of the rear substrate 3 has projections corresponding to the gate and data lines 15 and 16, and the alignment state of the molecules is unstable and can easily change around the projections.

When a lateral electric field has occurred between each gate line 15, each data line 16 and corresponding pixel electrodes 5, a force acts upon unstable liquid crystal molecules located adjacent to these lines and pixel electrodes, so as to orient them in the direction of the lateral electric field.

In other words, the lateral electric field that occurs between each gate line 15 and corresponding pixel electrodes 5 is substantially perpendicular to each gate line 15. Similarly, the lateral electric field that occurs between each data line 16 and corresponding pixel electrodes 5 is substantially perpendicular to each data line 16. Accordingly, the interaction of the alignment force applied to the alignment film 7 on the inner surface of the rear substrate 3 when the film was subjected to an aligning treatment, and the force of the lateral electric field determines the alignment direction of the liquid crystal molecules. Disclination occurs in a boundary between an area influenced by the lateral electric field, and an area free from the influence of the lateral electric field and in which the liquid crystal molecules are aligned in the alignment direction 7a by the alignment force in the alignment film 7.

In the liquid crystal cell 1 employed in the first embodiment, the alignment directions 7a and 8a of the alignment films 7 and 8 provided on the substrates 2 and 3 obliquely intersect the data lines 16 at a rubbing angle θ of 5° to 10° in one direction. Accordingly, concerning liquid crystal molecules that are aligned in an unstable manner because of the unevenness of the alignment film 7 near each gate line 15 and data line 16, the alignment force of the alignment film 7 balances with the force of the lateral electric field. As a result, an irregular alignment of the liquid crystal molecules is suppressed, and hence disclination that occurs between each pixel electrode 5 and one or both of a corresponding gate line 15 and a corresponding data line 16 can be made indistinctive.

Thus, the liquid crystal display device of the first embodiment can display a high quality image free from a reduction in contrast due to the disclination. Further, in this device, the open area ratio of the liquid crystal cell 1 can be increased to thereby further brighten the screen by providing no light-shielding film on the inner surface of the substrate 2, or by covering only the regions between adjacent pixel areas with the light-shielding film.

Moreover, as described above, in the liquid crystal display device of the first embodiment, the rubbing angle θ between the data lines 16 and the alignment directions 7a and 8a is preferably, 7° to 8°, and more preferably, 7.5°. The thus setting of the alignment directions 7a and 8a, so as to make the rubbing angle preferable, more effectively suppresses the occurrence of the disclination, thereby enabling a higher quality image.

Furthermore, the liquid crystal display device of the first embodiment employs the phase-difference plate 20 between the liquid crystal cell 1 and the front-side polarizing plate 18. This structure increases the viewing angle and contrast of a display, and hence enables the provision of a much higher quality image.

Figure 2:
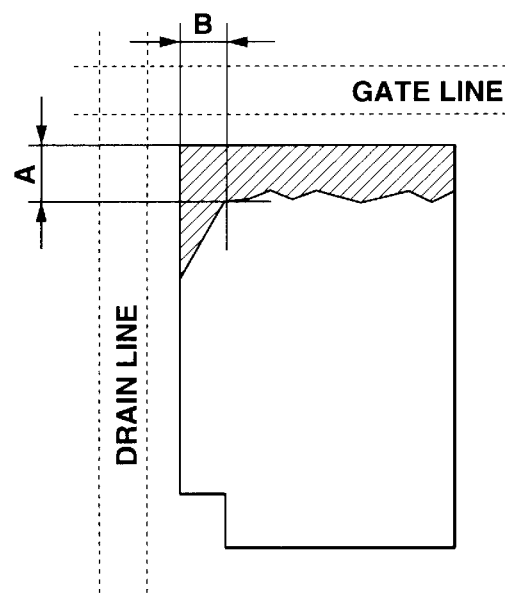
FIG. 2 is a plan view illustrating a state in which disclination occurs on one pixel electrode in the first embodiment, and useful in defining disclination sizes A and B for estimating the size of disclination.
Figure 3:
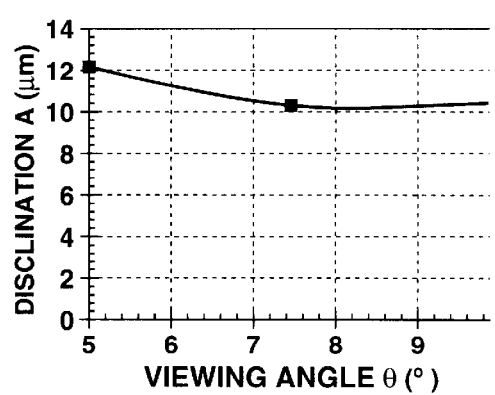
FIG. 3 is a graph illustrating the value of disclination size A with respect to a rubbing angle θ in the first embodiment.
Figure 4:
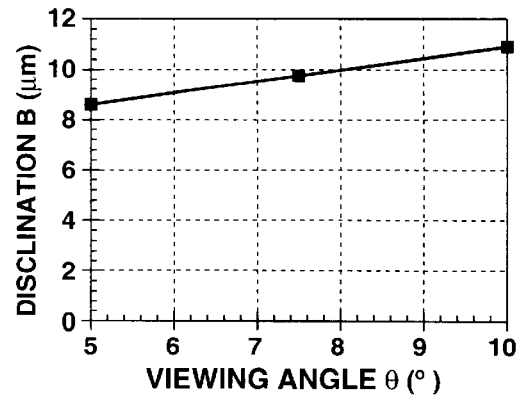
FIG. 4 is a graph illustrating the value of disclination size B with respect to the rubbing angle θ in the first embodiment.

FIG. 2 is a view useful in defining disclination sizes A and B as indexes for estimating the size of disclination that occurs in the first embodiment. FIGS. 3 and 4 show the disclination sizes A and B, respectively. As shown in FIG. 2, the disclination size A indicates the width of disclination that occurs on the edge of each pixel electrode 5, which is located along a corresponding gate line. Similarly, the disclination size B indicates the width of disclination that occurs on the edge of each pixel electrode 5, which is located along a corresponding drain line.

As shown in FIG. 3, the disclination size A is as small as 12 μm or less when the rubbing angle θ formed between the data lines 16 and the alignment direction is not less than 5°, and assumes a lowest value of 10 μm when the rubbing angle θ is near 8°. Further, as shown in FIG. 4, the disclination size B is as small as 11 μm or less when the rubbing angle θ is 10° or less, and is less than 10 μm when the rubbing angle θ is less than 8°. From these, it is understood that when the rubbing angle θ formed between the data lines 16 and the alignment direction is 5° or more and 10° or less, both the disclination sizes A and B are 12 μm or less, which is practically indistinctive. Further, if the rubbing angle θ falls within a range of 7° to 8° the disclination size A assumes its lowest value, and the disclination size B assumes a sufficiently low value. The most preferable rubbing angle θ is 7.5°.

Figure 6:
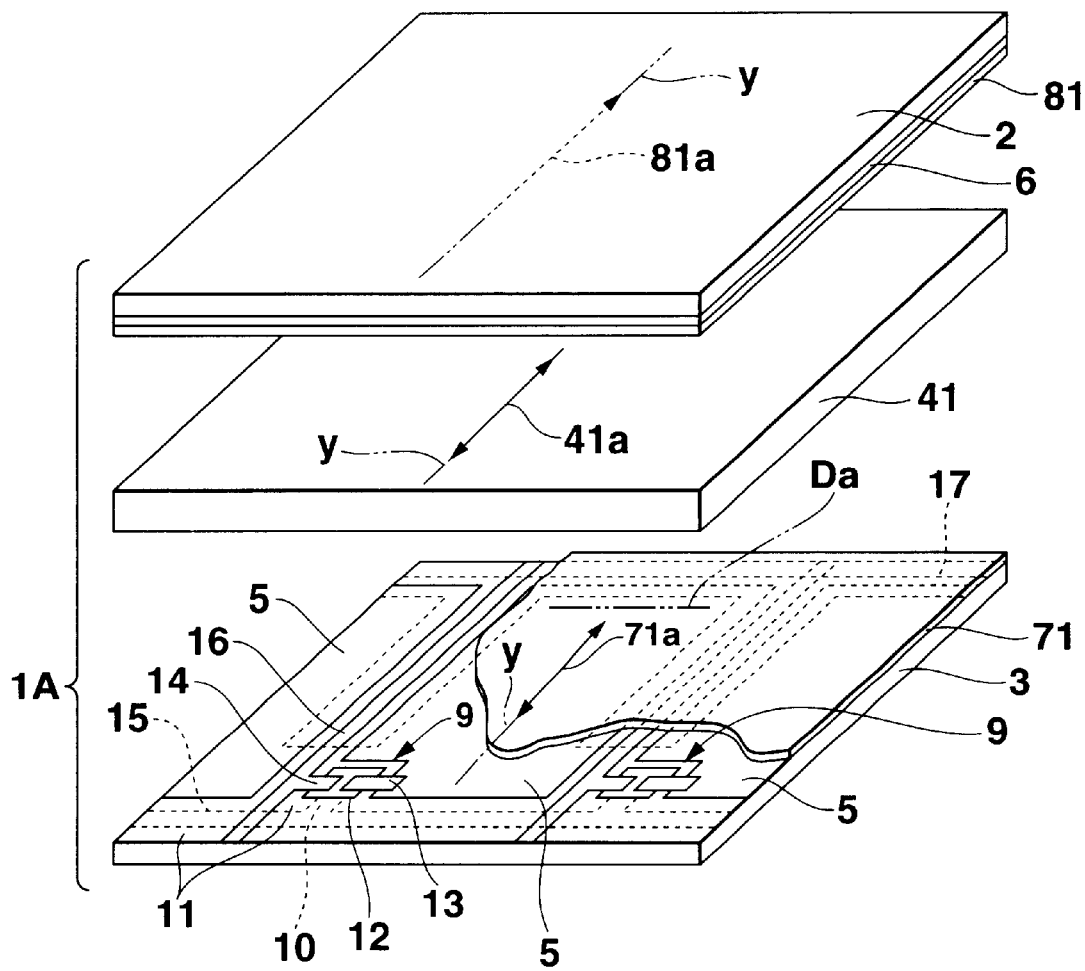
FIG. 6 is an exploded perspective view illustrating a comparative structure when the rubbing angle θ is 0°.
Figure 7:
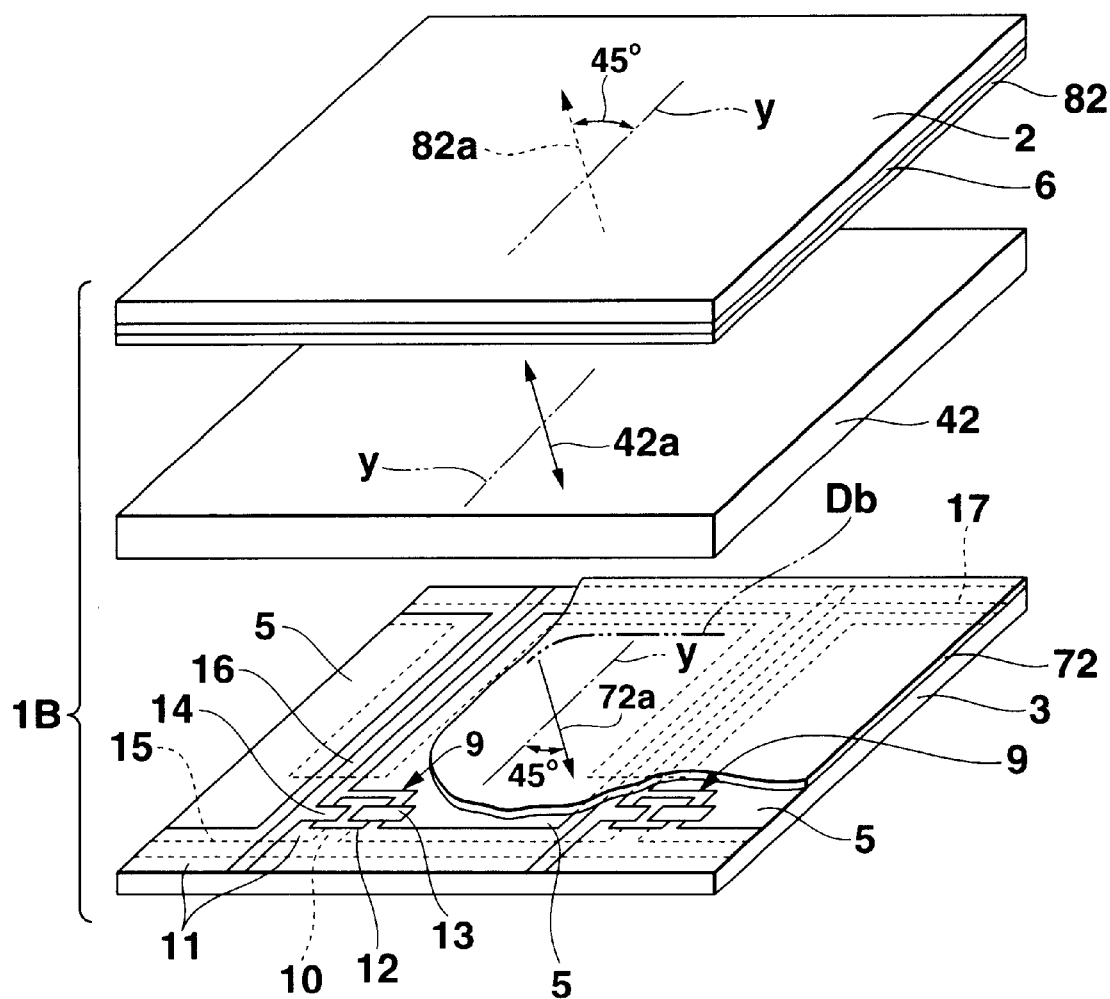
FIG. 7 is an exploded perspective view illustrating a comparative structure when the rubbing angle θ is 45°.

FIGS. 6 and 7 illustrate comparative structures. In the structure of FIG. 6, the direction in which liquid crystal molecules of the liquid crystal cell are aligned is parallel to the data lines 16 (i.e. the rubbing angle θ is 0°). In the structure of FIG. 7, the alignment direction intersects the data lines 16 at 45° (i.e. the rubbing angle θ is 45°).

Liquid crystal cells 1A and 1B in the respective comparative structures are similar to the liquid crystal cell 1 in the first embodiment, except for the alignment directions 71a (72a) and 81a (82a) of alignment films 71 (72) and 81 (82) formed on the respective inner surfaces of substrates 2 and 3. Therefore, in FIGS. 6 and 7, reference numerals corresponding to those used in the first embodiment denote similar elements, and no detailed description is given thereof.

In the comparative liquid crystal cell 1A shown in FIG. 6, the alignment directions 71a and 81a of alignment films 71 and 81 formed on the respective inner surfaces of substrates 2 and 3 are arranged substantially parallel to the data lines 16. In this case, disclination Da occurs in that area of a pixel electrode 5, which is located inside an edge of the electrode adjacent to a corresponding gate line 15, as is indicated by the thick two-dot line.

On the other hand, in the comparative liquid crystal cell 1B shown in FIG. 7, the alignment directions 72a and 82a of alignment films 72 and 82 formed on the respective inner surfaces of substrates 2 and 3 obliquely intersect a line "y" parallel to the data lines 16 at substantially 45°. In this case, disclination Db occurs in those areas of a pixel electrode 5, which are located inside edges of the electrodes adjacent to a corresponding gate line 15 and a corresponding data line 16, as is indicated by the thick two-dot line.

Since amounts Da and Db of disclination are brought about not in the form of a smoothly continuous line but in the form of a zigzag line, the apparent width of the disclination is large.

Therefore, in the liquid crystal display device using the comparative liquid crystal cell 1A or 1B shown in FIG. 6 or 7, a line of a brightness different from the brightness of the other portion of the pixel electrode arises along the amount Da or Db of disclination, thereby degrading the contrast of a display.

This reduction in contrast due to disclination can be suppressed by a light-shielding film provided on areas between adjacent pixel areas and disclination-occurred areas of the inner surface of the substrate 2 of the liquid crystal cell 1A or 1B. However, the light-shielding film reduces the open area ratio. A light shielding film of a large area, which covers disclination in the liquid crystal cell 1A or 1B, reduces the open area ratio of the liquid crystal display device and darkens its screen. On the other hand, in the liquid crystal cell 1 of the first embodiment, even when a light-shielding film is employed, the area of the film, which covers disclination, can be minimized to increase the open area ratio.

As described above, the first embodiment can have a smaller amount of disclination and a higher contrast than the comparative liquid crystal cells 1A and 1B. Further, in the first embodiment, even when using a light-shielding film, the area of the film covering the disclination is smaller and hence a higher open area ratio is obtained than the liquid crystal cells 1A and 1B.

In the first embodiment, the alignment films 7 and 8 provided on the substrates 2 and 3 of the liquid crystal cell 1 are rubbed so that the alignment directions 7a and Ba of the films 7 and 8 obliquely intersect the data lines 16 at an angle θ of 5° to 10° counterclockwise in the figure. The liquid crystal display device of the invention is not limited to this, but may be modified such that the alignment films are rubbed so as to make the alignment directions 7a and 8a obliquely intersect the data lines 16 at the angle θ of 5° to 10° clockwise in the figure. Also, in this case, the same advantage can be obtained. Further, it is sufficient if the alignment films 7 and 8 are rubbed so as to make the alignment directions 7a and 8a obliquely intersect the gate lines or the drain lines at a predetermined angle. The same advantage as in the first embodiment can be obtained by rubbing the films 7 and 8 so as to make the alignment directions 7a and 8a obliquely intersect the gate lines at an angle θ of 5° to 10°.

In the liquid crystal display device of the first embodiment, the reflection/illumination unit 21 including the surface light source 22 and a semi-transmission/reflection plate 23 is located behind the rear-side polarizing plate 19 that is located on the rear surface of the liquid crystal cell 1. However, both a reflection display using outside light and a transmission display using illumination light from behind can also be executed by providing the inner or outer surface of the rear substrate 3 of the liquid crystal cell 1 with a semi-transmission/reflection film consisting of a rough deposition film of, for example, aluminum, and locating only the surface light source 22 behind the rear-side polarizing plate 19.

When forming a semi-transmission/reflection film on the inner surface of the rear substrate 3 of the liquid crystal cell 1, it is sufficient if the semi-transmission/reflection film is coated with a transparent insulating film, and the TFTS 9, the gate lines 15, the compensation capacitance electrodes 17, the data lines 16 and the pixel electrodes 5 are provided thereon.

Also, when forming a semi-transmission/reflection film on the inner or outer surface of the rear substrate 3 of the liquid crystal cell 1, the transmission axes 18a and 19a of the front- and rear-side polarizing plates 18 and 19 and the phase delay axis 20a of the retardation plate 20 may be set in the same directions as in the first embodiment.

Thus, where a semi-transmission/reflection film is formed on the inner or outer surface of the rear substrate 3 of the liquid crystal cell 1, and only the surface light source 22 is located behind the rear-side polarizing plate 19, illumination light from the surface light source 22 is transmitted, when executing the transmission display using illumination light, to the front surface of the display device through the rear-side polarizing plate 19, the semi-transmission/reception film, the liquid crystal cell 1, the retardation plate 20 and the front-side polarizing plate 18. On the other hand, when executing the reflection display using outside light, light, which enters the liquid crystal display device from its front surface, and passes through the front-side polarizing plate 18, the retardation plate 20 and the liquid crystal layer 4 of the liquid crystal cell 1, reflects on the semi-transmission/reception film, passes through the liquid crystal layer 4, the retardation plate 20 and the front-side polarizing plate 18, and reaches the front surface of the display device.

In other words, the formation of a semi-transmission/reception film on the inner or outer surface of the rear substrate 3 of the liquid crystal cell 1 enables the reflection display using outside light to be executed without passing light through the rear-side polarizing plate 19. Accordingly, the interruption of light by the rear-side polarizing plate 20 is avoided, thereby enabling a brighter reflection display.

Further, although, in the first embodiment, the retardation plate 20 is interposed between the liquid crystal cell 1 and the front-side polarizing plate 18, the plate 20 may be provided between the liquid crystal cell 1 and the rear-side polarizing plate 19. Furthermore, the retardation plate 20 can be omitted.

In addition, the liquid crystal display device of the first embodiment is of a reflection/transmission dual-purpose type, which can execute the reflection display using outside light and the transmission display using illumination light from behind. However, the present invention can also be used as a reflection-type liquid crystal display device capable of only the reflection display using outside light, or as a transmission-type liquid crystal display device capable of only the transmission display using illumination light.

When using the present invention as the reflection-type liquid crystal display device, it is sufficient if the outer surface of the front substrate of the liquid crystal cell is at least provided with a polarizing plate having its optical axis directed in a predetermined direction.

[Second Embodiment]

Figure 5:
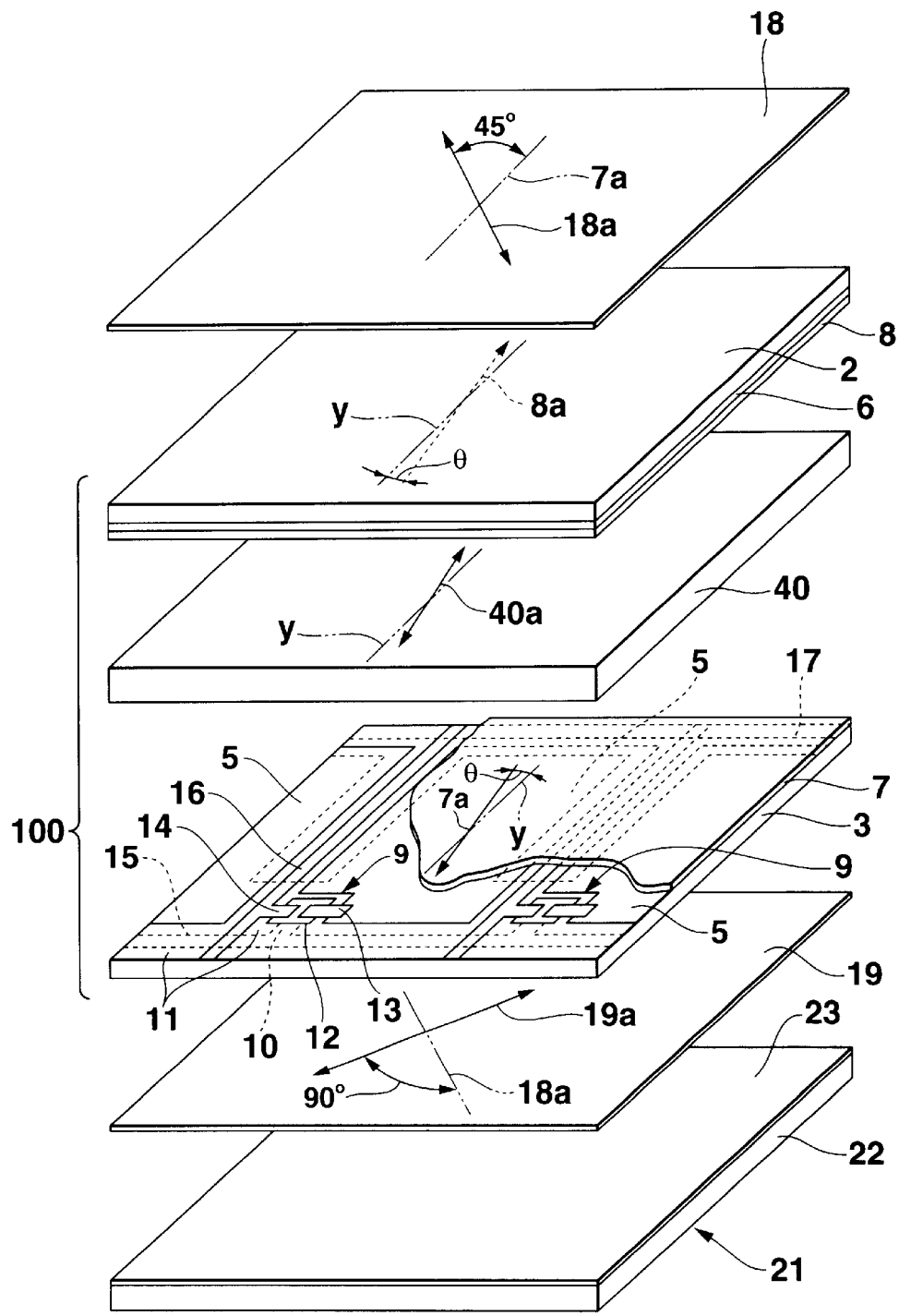
FIG. 5 is an exploded perspective view illustrating a liquid crystal display device according to a second embodiment of the invention.

Referring to FIG. 5, a liquid crystal device according to a second embodiment of the invention will be described. In the second embodiment, a nematic liquid crystal containing a chiral agent is used in order to enhance the stability of the initial alignment state of the liquid crystal layer of the liquid crystal cell, and the liquid crystal molecules of the mixed liquid crystal are homogeneously aligned with their directors arranged in one direction, thereby preventing the homogeneous alignment state from becoming an irregular alignment state to maintain a high-quality display.

FIG. 5 is an exploded perspective view schematically illustrating a liquid display element employed in the second embodiment.

As in the above-described first embodiment, the liquid crystal display device of the second embodiment is of a reflection/transmission dual-purpose type, which can execute a reflection display using outside light and a transmission display using illumination light from behind. This display element includes a liquid crystal cell, a pair of front and rear polarizing plates with the liquid crystal cell interposed therebetween, and reflection/illumination means located behind the rear-side polarizing plate. The second embodiment differs from the first embodiment only in that in the former, no retardation plate is employed and the liquid crystal layer has a structure different from that in the latter. The other elements in the second embodiment are similar to those in the first embodiment. In FIG. 5, reference numerals corresponding to those used in the first embodiment denote similar elements, and no detailed description is given thereof.

A liquid crystal cell 100 in the second embodiment is an active matrix liquid crystal display device using TFTs 9 as active elements. On the inner surface of one of a pair of front and rear transparent substrates 2 and 3, which is, for example, the rear substrate 3 located remote from the observation side of a display, there are provided a plurality of pixel electrodes 5, a plurality of TFTs 9 connected to the pixel electrodes 5, a plurality of gate lines each for supplying a gate signal to a corresponding row of TFTs 9, a plurality of data lines 15 each for supplying a data signal to a corresponding column of TFTs 9, and a plurality of compensation capacitance electrodes 17 for forming compensation capacitances between themselves and the pixel electrodes 5.

On the inner surface of the other substrate, i.e. the observation-side substrate 2, there are provided color filters (not shown), each of which has a plurality of colors such as red, green and blue and is located in a position opposed to a corresponding one of the pixel electrodes 5, and an electrode 6 in the form of a transparent film opposed to the pixel electrodes 5.

Further, homogeneous alignment films 7 and 8 made of, for example, polyimide are provided on the innermost surfaces of the substrates 2 and 3, respectively. As in the first embodiment, the alignment films 7 and 8 are processed by rubbing their surfaces so that their alignment directions 7a and 8a are substantially parallel to each other but opposite to each other, and intersect the data lines 16 at an angle θ of 5° to 10°.

The pair of substrates 2 and 3 are jointed to each other at their peripheries by means of a frame-shaped sealing member (not shown). A liquid crystal layer 4 is provided between the substrates 2 and 3 within the area sealed by the sealing member.

The liquid crystal layer 40 is made of a nematic liquid crystal having a positive dielectric anisotropy, which contains one or both of a chiral agent that shows a liquid crystal phase and a chiral agent that does not show it. The molecules of the liquid crystal have their alignment direction determined by the alignment films 7 and 8 near the front and rear substrates 2 and 3. More specifically, the molecules are slightly pre-tilted with respect to the surfaces of the substrates 2 and 3, and homogeneously aligned, without being twisted, in one direction 40a (i.e. the alignment directions 7a and 8a).

Further, a pair of front-side and rear-side polarizing plates 18 and 19 are provided with the liquid crystal cell 100 interposed therebetween, and reflection/illumination unit 21 is arranged on the rear surface of the rear-side polarizing plate 19.

In the liquid crystal layer of the liquid crystal cell 100, the nematic liquid crystal contains an amount of chiral agent, which makes, less than 0.09, the ratio d/p of the thickness d ($\mu$m) of the liquid crystal layer 40 to the natural pitch p ($\mu$m) of the nematic liquid crystal mixed with the chiral agent. The chiral agent of an amount falling within this range enables the liquid crystal molecules to be homogeneously aligned in their initial state, without being twisted.

If too much chiral agent is added to the liquid crystal, it functions to twist the liquid crystal molecules against the force of the anchoring of the alignment films and the natural cohesive power of the nematic liquid crystal.

Thus, whether the liquid crystal molecules are homogeneously aligned, i.e. the directors of the molecules are arranged in one direction, in the initial state, or they are twisted is determined on the basis of the strength of the anchoring of the alignment films, the natural cohesive power of the nematic liquid crystal, and the ratio d/p of thickness d ($\mu$m) of the liquid crystal layer 40 to the natural pitch p ($\mu$m) of the nematic liquid crystal mixed with the chiral agent. In the liquid crystal cell employed in the second embodiment, if the ratio d/p is not less than 0.9, the liquid crystal molecules are twisted in the initial state, while if the ratio d/p is less than 0.9, the liquid crystal molecules are homogeneously aligned, i.e. the directors of the molecules are arranged in one direction, in the initial state. In order to more reliably make the nematic liquid crystal assume a homogeneous alignment state with the directors arranged in one direction, it is desirable that the ratio d/p should be set at 0.075 or less.

If, for example, the thickness d of the liquid crystal layer is 5 $\mu$m as in the second embodiment, a chiral-agent-mixed nematic liquid crystal having a natural pitch p of 56 $\mu$m is used. If the thickness d of the liquid crystal layer is 5 $\mu$m and the natural pitch p of the chiral-agent-mixed nematic liquid crystal is 56 $\mu$m, d/p=$5/56 \approx 0.089$, at which the liquid crystal molecules are homogeneously aligned in the initial state with their directors arranged in one direction.

As mentioned above, the natural pitch p of the chiral-agent-added nematic liquid crystal is determined by the amount of the added chiral agent. Further, the force that twists the nematic liquid crystal is represented by a twisting power, which is expressed by 1/(p·c) (where p presents the natural pitch of the liquid crystal, and c represents the amount (weight %) of the chiral agent contained in the liquid crystal material).

Accordingly, if a chiral agent having a twisting power [1/(p·c)] of 1.7 is added, the amount c of the chiral agent for obtaining a liquid crystal material having a natural pitch p of 56 $\mu$m is c=1/(1.7×56)×100$\approx$1.50 (weight %). A mixed liquid crystal having a natural pitch p of 56 $\mu$m or more can be obtained by adding 1.50 (weight %) of the chiral agent.

It is more preferable to set the amount of the added chiral agent so that the ratio d/p will be less than 0.075. In this case, a more reliable initial homogeneous alignment state of the liquid crystal molecules can be achieved.

If the thickness d of the liquid crystal layer is 5 $\mu$m, it is preferable to use a mixed liquid crystal with a natural pitch p of 67 $\mu$m or more as a chiral-agent-added nematic liquid crystal. If the thickness d is 5 μm, and the natural pitch p of the liquid crystal is 67 μm, d/p=5/67≈0.075, at which a more stable homogeneous alignment can be obtained.

As described above, the liquid crystal layer 40 of the liquid crystal cell 100 is formed of a chiral-agent-added nematic liquid crystal having a homogeneous alignment in which the directors of the liquid crystal molecules are arranged in one direction. An intermolecular force is exerted on the liquid crystal molecules by the chiral agent added to the liquid crystal. As aforementioned, the intermolecular force of the liquid crystal molecules is also affected by the anchoring of the alignment films 7 and 8 and the nematic liquid crystal.

Therefore, the liquid crystal display device of this embodiment has a stable homogeneous alignment in which the directors of the liquid crystal molecules are arranged in one direction. Even when the alignment of the liquid crystal molecules fluctuates due to the electric field or the deformation of a substrate 2 or 3 of the liquid crystal cell 100, it returns to its original homogeneous state. Thus, the homogeneous state of the liquid crystal molecules is not degraded, and hence a high-quality display is maintained.

In the liquid crystal display device of the second embodiment, a retardation plate for compensating optical properties may be interposed between the front-side polarizing plate and the liquid crystal cell, as in the first embodiment. Further, the liquid crystal layer of the liquid crystal cell 1 in the first embodiment may be formed of a chiral-added nematic liquid crystal having a homogeneous alignment in which the liquid crystal molecules are not twisted, as in the second embodiment. Also in this case, the same advantage as the second embodiment can be obtained.

In addition, although the liquid crystal cell 100 used in the second embodiment is an active matrix liquid crystal display device using TFTs as active elements, the invention is not limited to this, but it is sufficient if the liquid crystal cell has a liquid crystal layer that is made of a chiral-added nematic liquid crystal having its molecules homogeneously aligned. For example, it may be an active matrix liquid crystal display device using, as an active element, a non-linear resistor with two terminals, such as an MIM, a simple matrix liquid crystal display device, or a segment-type liquid crystal display device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a first substrate having at least one first electrode formed thereon;
   a second substrate having a plurality of second electrodes formed thereon and opposed to the first electrode, the second substrate being opposed to the first substrate with a predetermined gap there between, the second electrodes being arranged to form a matrix display section having a plurality of pixels arranged in a matrix of rows and columns, each of the pixels being defined by an area in which the second electrodes on the second substrate are opposed to the first electrode on the first substrate;
   a first alignment film formed on the second substrate with the second electrodes, n aligning treatment being executed on the first alignment film in a first direction that intersects, at an angle of 5° to 10°, one of a row direction and a column direction of the matrix display section;
   a second alignment film formed on the first substrate having the first electrode formed thereon, an aligning treatment being executed on the second alignment film in a second direction substantially parallel to the first direction of the first alignment film; and
   a liquid crystal sealed between the first and second substrates and constituting a liquid crystal layer that ranges from liquid crystal molecules adjacent to the first alignment film to liquid crystal molecules adjacent to the second alignment film,
   wherein liquid crystal molecules in the liquid crystal layer are arranged in one direction, and
   wherein alignment of the liquid crystal molecules in the liquid crystal layer is controlled by generating an electric field in a direction perpendicular to the first and second substrates, applying the generated electric field to the liquid crystal sealed between he first and second substrates in a direction perpendicular to the liquid crystal, and causing the liquid crystal molecule, which are arranged substantially parallel to the first a d second substrates when no electric field is applied, to stand up.

2. The liquid crystal display device according to claim 1, wherein the first direction, in which the aligning treatment is executed on the first alignment film, intersects, at an angle of 7° to 8°, one of the row direction and the column direction of the matrix display section.

3. The liquid crystal display device according to claim 1, further comprising a pair of polarizing plates each provided at an outer side of a corresponding one of the first and second substrates, the polarizing plates having their respective optical axes arranged perpendicular to each other.

4. The liquid crystal display device according to claim 3, wherein the optical axis of one of the polarizing plates intersects, substantially at an angle of 45°, the second and first directions of the respective second and first alignment films respectively provided on the first and second substrates.

5. The liquid crystal display device according to claim 1, further comprising a pair of polarizing plates each provided at an outer side of a corresponding one of the first and second substrates, and a retardation plate provided between the first substrate and a corresponding one of the polarizing plates for correcting retardation of the liquid crystal layer.

6. The liquid crystal display device according to claim 5, wherein the retardation plate has its optical axis arranged to intersect, substantially at an angle of 90°, the second and first directions of the respective second and first alignment films respectively provided on the first and second substrates.

7. The liquid crystal display device according to claim 1, wherein the liquid crystal is a liquid crystal mixed with a chiral substance that imparts, to the liquid crystal molecules, a power for twisting the liquid crystal molecules, and the liquid crystal layer is homogeneously aligned, without being twisted, between the first and second alignment films by alignment forces of the first and second alignment films.

8. The liquid crystal display device according to claim 7, wherein the liquid crystal is a nematic liquid crystal mixed with a chiral agent, a ratio d/p of a thickness d (μm) of the liquid crystal layer to a natural pitch p (μm) of the nematic liquid crystal mixed with the chiral agent being less than 0.09.

9. The liquid crystal display device according to claim 7, wherein the liquid crystal is a nematic liquid crystal mixed with a chiral agent, a ratio d/p of a thickness d ($\mu$m) of the liquid crystal layer to a natural pitch p ($\mu$m) of the nematic liquid crystal mixed with the chiral agent being not more than 0.075.

10. The liquid crystal display device according to claim 1, further comprising a plurality of active elements arranged on the second substrate and connected to the respective second electrodes on the second substrate, and a plurality of lines arranged along respective rows or columns of second electrodes in a matrix for supplying a voltage to the active elements, and wherein an aligning treatment is executed on the first alignment film so that a direction of alignment intersects the plurality of lines at an angle of 5° to 10°.

11. The liquid crystal display device according to claim 1, further comprising a plurality of thin-film transistors arranged on the second substrate and connected to the respective second electrodes on the second substrate, a plurality of control lines arranged along respective rows or columns of second electrodes in a matrix for supplying a control signal to the thin-film transistors, and a plurality of data lines arranged along respective columns or rows of second electrodes for supplying a signal corresponding to display data to the second electrodes via the thin-film transistors, and wherein an aligning treatment is executed on the first alignment film so that a direction of alignment intersects the control lines or the data lines at an angle of 5° to 10°.

12. The liquid crystal display device according to claim 11, wherein the aligning treatment is executed on the first alignment film so that the direction of alignment intersects the data lines at an angle of 5° to 10°.

13. The liquid crystal display device according to claim 11, wherein the liquid crystal is a liquid crystal mixed with a chiral substance that imparts, to the liquid crystal molecules, a power for twisting the liquid crystal molecules, and the liquid crystal layer is homogeneously aligned, without being twisted, between the first and second alignment films by alignment forces of the first and second alignment films.

14. The liquid crystal display device according to claim 11, wherein the liquid crystal is a nematic liquid crystal mixed with a chiral agent, a ratio d/p of a thickness d ($\mu$m) of the liquid crystal layer to a natural pitch p ($\mu$m) of the nematic liquid crystal mixed with the chiral agent being less than 0.09.

* * * * *